May 14, 1968  J. A. VAN HORN  3,382,667
WATCH REGULATOR
Filed April 1, 1966

*INVENTOR.*
JOHN A. VAN HORN
BY
*Le Blanc & Shur*
ATTORNEYS

United States Patent Office 3,382,667
Patented May 14, 1968

3,382,667
WATCH REGULATOR
John A. Van Horn, Lancaster, Pa., assignor to Hamilton Watch Company, Lancaster, Pa., a corporation of Pennsylvania
Filed Apr. 1, 1966, Ser. No. 539,507
15 Claims. (Cl. 58—107)

ABSTRACT OF THE DISCLOSURE

Disclosed is a watch regulator which varies the frequency of oscillation by changing the moment of inertia of a balance wheel. It is based on the fact that two weights may be moved to adjust the moment of intertia without affecting watch poise even though the weights do not lie on opposite sides of the rotational axis of the balance wheel. In the embodiment shown, the movable weights are both on the same side of a plane containing the rotational axis. The weights move along the opposite ends of a threaded, rotatable rod carried by the balance wheel.

---

This invention relates to the regulation of timepieces and other rotating and oscillating systems and more particularly to a device for regulating the frequency of oscillation of a watch balance wheel. Important features of the invention include the simultaneous movement of a pair of weights to change the balance wheel moment of inertia while maintaining the center of gravity of the balance wheel constant with respect to the balance wheel axis of rotation.

The rate of an ordinary watch, that is how fast or how slow it runs, is determined by the frequency of the oscillations of the balance wheel. This frequency depends basically upon two things. These are (1) the moment of inertia of the balance wheel and (2) the strength of the hairspring. Accordingly, the watch rate is altered by alteration of one or both of either the balance wheel inertia or the hairspring strength.

The commonest device for controlling watch rate is the so-called watch regulator. This is normally a device for altering the effective length of the hairspring so as to change hairspring strength. It has the advantage of permitting large corrections in rate and at the same time is reasonably simple in construction. However, it has the serious disadvantage of being quite sensitive so that small changes in the location of the regulator result in large changes in watch rate. Because of this extreme sensitivity, it is difficult to regulate a watch closely. That is, the extreme sensitivity creates uncertainties in the effects of a conventional regulator adjustment, which uncertainties stem from the fact that the hairspring is usually not completely uniform from one short section to the next and from the fact that the regulator depends upon friction for its location and may shift slightly some time after regulation has been accomplished.

For these reasons, very good watches are sometimes regulated by the use of the so-called meantime screws. The meantime screw does not affect hairspring strength, but rather is a device for altering the moment of inertia of the balance wheel. Each screw is tightly fitted in the rim of the balance wheel. With this tight fit, the screw will maintain its position even though it is not driven tightly against a stop. As a result, the radial distance of each screw can be altered by turning it and it will hold its new position so that the moment of inertia of the wheel is altered in a controllable fashion. The principal disadvantage of meantime screw rate regulation is the requirement that the screws be used in pairs. This is because it is necessary that the mass of the balance wheel be so distributed that the center of gravity of the wheel is accurately at the center of rotation. If the center of gravity of the wheel is not on the axis of rotation, gravitational torque exists and this affects the rate in a manner which depends upon the position of the watch. The watch maker refers to this adjustment of the center of gravity of the wheel as "poise." Poising must be done very accurately since large rate errors may result from minor errors in the poise itself. Obviously if the radial position of one meantime screw is changed the poise is altered. Therefore, a screw can never be altered alone, but only with a companion screw whose position is correspondingly altered. The screws are always placed in pairs at opposite ends of the same balance wheel diameter.

The principal defect in the meantime screw system for regulating a watch balance wheel is the requirement for a double adjustment which imposes close attention on the part of the person making the correction in rate. If the two corresponding screws are not changed in precisely the same fashion, the poise will be destroyed and the rate of the watch will be erratic from its dependence upon the position of the watch.

Various elaborate devices have been proposed to permit a change in location of two weights to be made by a single adjustment. However, these have always been based upon the use of movable weights which are on opposite sides of the balance staff and on the same diameter. However, none has been completely satisfactory due to the fact that the diameter passes through the center of the balance wheel circle, which is occupied by the balance staff.

The present invention avoids the above-mentioned difficulties by providing a very simple and inexpensive mechanism which makes it possible to accomplish the single adjustment of two weights so as to modify balance wheel inertia and hence rate, while at the same time, maintaining balance wheel poise. This is made possible by the discovery that poise can be maintained during a linear adjustment of the position of two weights along the chord of a circle, formed by the balance wheel rim. That is, it is not necessary for the adjustable weights to lie on the same diameter. Recognition of this fact permits the very simple structure provided by this invention.

It is therefore one object of the present invention to provide an improved method and device for modifying the moment of inertia of an oscillating or rotating system without at the same time changing the system center of gravity with respect to its axis of rotation.

Another object of the present invention is to provide a simplified method and device for regulating the rate of a timepiece.

Another object of the present invention is to provide a watch regulator which effects watch regulation by means of a single adjustment.

Another object of the present invention involves a simplified and inexpensive watch regulator in which two weights are simultaneously adjusted to positions other than along a common diameter of a watch or clock balance wheel. In the present invention the two weights move along a chord of the balance wheel and are moved simultaneously either toward or away from each other. This movement alters the moment of inertia of the balance wheel system about its rotational axis, but does not change watch poise.

These and further objects and advantages of the invention will be more apparent upon reference to the following specification, claims and appended drawings, wherein:

Figure 1:
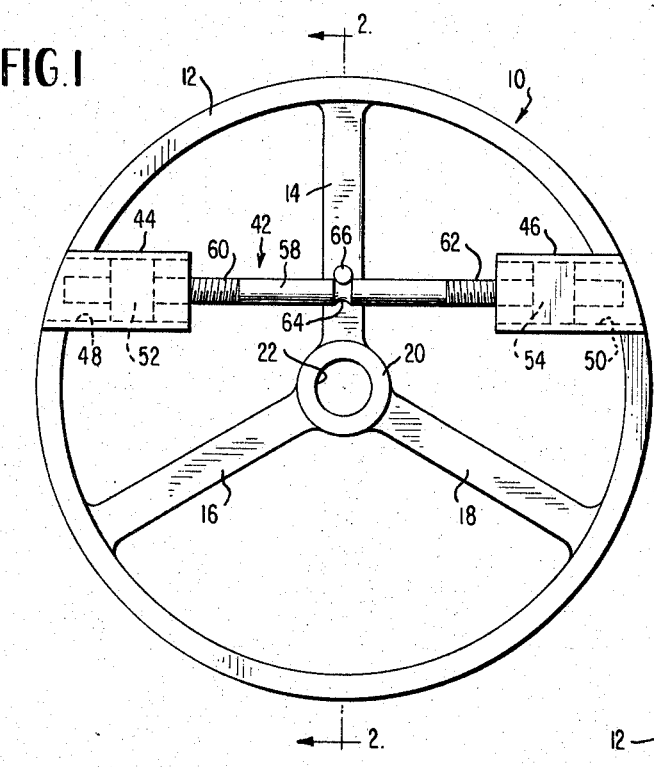
FIGURE 1 is a plan view of a watch balance wheel and regulating mechanism constructed in accordance with the present invention.
Figure 3:
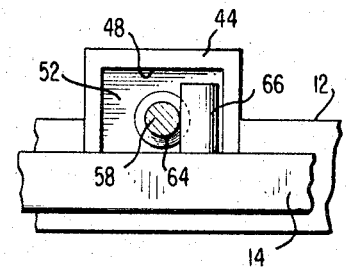
FIGURE 3 is an enlarged view showing a portion of the regulating mechanism of FIGURE 1.
Figure 2:
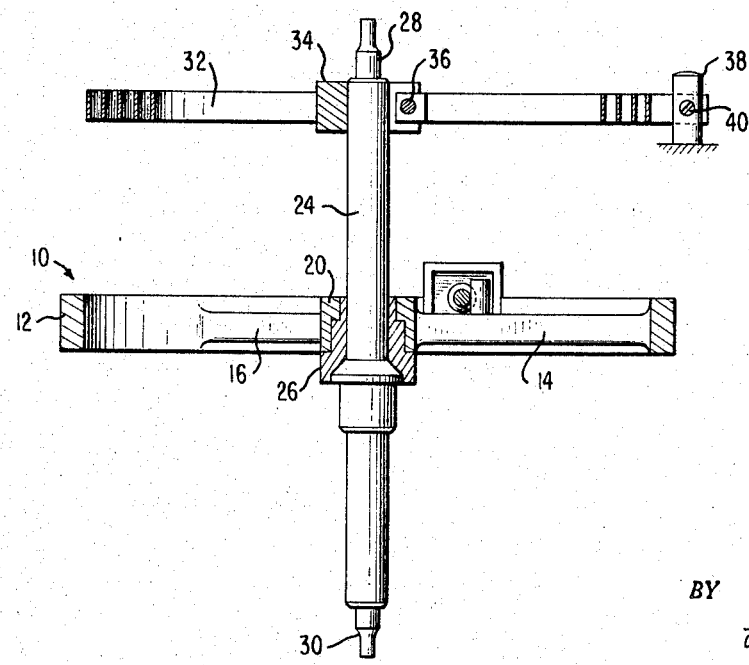
FIGURE 2 is an elevational view with parts in section taken along line 2—2 of FIGURE 1.

Referring to the drawings, the balance wheel generally indicated at 10 in FIGURE 1, comprises in this case a circular rim 12 joined by a plurality of radial spokes or arms 14, 16 and 18 to a central hub 20. The hub 20 is apertured as at 22, to receive the balance wheel staff 24 of FIGURE 2. Hub 20 is mounted for rotation with the balance staff 24 by a collar 26 carried by the balance staff. Balance staff 24 is provided at its ends with pivots 28 and 30, in the usual manner, for reception in suitable bearings in the watch bridge and pillar plate (not shown).

Forming part of the balance assembly along with the balance wheel 10 and balance staff 24 is a conventional hairspring 32. Hairspring 32 has its inner end secured to a collar 34 mounted on the upper end of the balance staff 24 by means of a screw 36. The outer end of the hairspring 32 is attached to a stationary portion of the watch, that is to a hairspring stud 38, by means of a second screw 40. The balance wheel 10 may be driven in any suitable manner and by way of example only, may be driven by an electrical coil mounted thereon to form an electric watch movement of the type shown in Van Horn et al. Patent No. 2,888,797. Reference may be had to that patent for a more detailed discussion of the balance wheel drive and associated balance assembly structure, it being understood that the present invention is equally applicable to other types of watch and clock constructions incorporating an oscillating element in the nature of a balance wheel.

Figure 4:
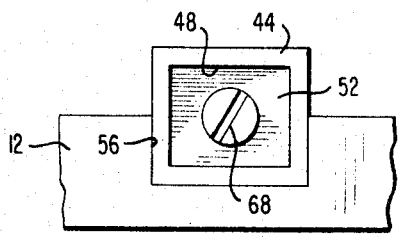
FIGURE 4 is an enlarged view looking at the watch regulating mechanism from the outer side of the balance wheel rim.

The novel watch regulator mechanism of the present invention generally indicated at 42 in FIGURE 1 comprises a pair of bosses 44 and 46 secured to the balance wheel rim and provided with central apertures 48 and 50 adapted to slidably receive a pair of equal weights or blocks 52 and 54 respectively. The weights 52 and 54 are preferably of rectangular configuration and are slideable in the correspondingly shaped rectangular apertures 48 and 50 formed in the rectangular housings or bosses 44 and 46. The bosses 44 and 46 may be formed integral with the balance wheel rim 12 or alternatively may be welded or otherwise suitably secured in notches formed in the balance wheel rim such as the notch illustrated at 56 in FIGURE 4 receiving boss 44.

Connecting weights 52 and 54 is an elongated bar or rod 58 of circular cross section, which rod is provided with oppositely directed threads 60 and 62 at each end. The weights 52 and 54 are similarly threaded such that rotation of rod 58 causes the weights 52 and 54 to simultaneously advance toward or away from each other along the center line of rod 58 depending upon the direction of rotation of the rod. That is, when the rod 58 rotates in one direction, the weights 52 and 54 move an equal distance towards each other and when rod 58 is rotated in the opposite direction, the weights move apart. Weights 52 and 54 are preferably of the same size and shape and of equal mass so that each equally affects the moment of inertia of the balance assembly. The central portion of rod 58 passes over spoke 14 and is provided with an annular groove or notch 64 receiving the edge of a pin 66 mounted on spoke 14. Pin 66 in engaging in groove 64 prevents any longitudinal movement of rod 58.

In operation, since the rod 58 is provided with a right-hand thread on one end and a left hand thread on the other, rotation of the rod moves both the sliding weights 52 and 54 in, or both the sliding weights out, depending on the direction of rotation of the rod. Since there is no motion in the vertical direction (perpendicular to the plane of the balance wheel), the poise with respect to the horizontal axis, i.e., in the plane of the balance wheel, is unchanged. Furthermore, since the horizontal motion is symmetrical, and the two weights are equal, poise about the vertical axis, i.e., the axis of rotation of balance staff 24, is also unchanged. However, the moment of inertia around the rotational axis of the balance wheel is modified in accordance with the movement of the weights. While rotation of the rod 58 may be manually accomplished at its accessible center portion in FIGURE 1, it is preferred that one or both of the apertures 48 and 50 extend completely through the rim and the end of rod 58 is provided with a groove 68 illustrated in FIGURE 4 adapted to receive the end of a screw driver inserted through the rim of the balance wheel.

The regulator can be simply and rapidly assembled by inserting the rod 58 into the empty holes or apertures 48 and 50. The rod is then dropped into position along side pin 66 and the sliding weights then inserted into the apertures 48 and 50 from outside the balance wheel rim. If blind holes are preferred for any reason, easy assembly is still possible by linking rod 58 in two sections which are fixed together when the rest of the assembly has been completed.

A variant construction is where one of the weights 52 or 54 carries the rod 58 rigidly attached and in which the outside of the same weight is round and externally threaded. That is to say, it forms a long screw with different threads on the outside of the head. At the other end of the screw, the other weight and rod remain the same as illustrated in FIGURE 1. Rotation of the long screw in this alternate construction moves both weights in a fashion which depends upon the relation of the two screws. One usable system is to make the weight of the long screw (both head and shank) equal to the weight of the sliding weight and to make the thread on the head with half the pitch of the thread on the shank, and in the same direction, i.e., both right-handed. Such revision results in a system which is obstensibly simpler since it contains fewer parts. However, in actual practice, it is easier to retain weight equality with the system shown in the drawings, and for this reason that construction is preferred.

It is apparent that the function of the bosses 44 and 46 is solely to restrict the motion of the weights 52 and 54. The bosses can be replaced by any structure which fulfills this purpose, such as a pair of pins extending from the rim and received in suitable slots formed in the sliding blocks, or it may be replaced by pins extending outwardly from the weights themselves and entering suitable slots in the rim. Similarly, the bosses and weights need not have mating rectangular configurations, but may be round and suitably keyed together to prevent relative rotation therebetween. Other possible modifications and changes are readily apparent.

As can be seen for the above, the present invention provides a novel and simple mechanism for changing the moment of inertia of any type rotating or oscillating system and is especially suited for use in regulating the balance wheel of a watch. It provides a simplified inexpensive structure which may be readily and simply assembled and then simply adjusted to provide reliable watch regulation. Important features of the invention include the fact that regulation is effected through a single adjustment as opposed to the double meantime screw adjustments previously most commonly used for changing balance wheel moment of inertia. This is made possible because the weights are adjustable to various positions, which positions do not lie on a diameter of the balance wheel, which diameter necessarily includes a portion of the balance staff 24. Rather, the weights are adjustable into positions which lie along a chord of the circle formed by the circular balance rim 12. As the weights move closer together, the moment of inertia of the balance wheel assembly is correspondingly reduced, whereas the center of gravity of the equal weights and bar 58 always lies along a line parallel to the rotational axis of the balance wheel and passing through the center of rod 58. If the balance wheel is initially accurately poised, such as by use of other weights or screws (not shown), then the movement of weights 52 and 54, while changing the moment of inertia, has absolutely no effect whatsoever on the previous poise condition of the balance wheel assembly. That is, the initially poised wheel remains poised since the center of gravity of the double weight and rod combination remains the same irrespective of the movement of the weights 52 and 54. That is, the center of gravity always passes through the midpoint of rod 58 and hence the overall center of gravity of the assembly which is preferably coincident with the rotational axis of the balance wheel remains unchanged.

In the prior constructions of which applicant is aware, even where a single adjustment is involved, the weights always lie substantially along a diameter of the balance wheel on opposite sides of the balance staff thus necessitating a more complicated adjusting arrangement designed to avoid interference with the balance staff passing through the center of the balance wheel. In the present invention, the weights are not on diametrically opposite sides of the balance staff, but are in fact, both positioned on one side of a plane containing the rotational axis of the balance wheel. In the embodiment shown, the weights move along a chord of the circle formed by the balance wheel rim and having its center on the rotational axis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for changing the moment of inertia of a rotatable body about its rotational axis without changing its center of gravity with respect thereto comprising a pair of weights carried by said body, and means coupled to said weights corresponding increments of distance along separate paths, both of said paths lying wholly on one side of a plane containing said rotational axis.

2. Apparatus according to claim 1 wherein said moving means comprise means for moving said weights simultaneously.

3. Apparatus according to claim 2 wherein said moving means comprise means for moving said weights in opposite directions along a single chord of a circle having its center on the rotational axis of said body.

4. Apparatus for changing the moment of inertia of a rotational body about its rotational axis without changing its center of gravity with respect thereto comprising a pair of movable weights on said body, and means coupled to said weights for simultaneously moving said weights along separate paths, said paths being chosen so that said bodies never lie on diametrically opposite sides of said rotational axis.

5. Apparatus according to claim 4 wherein said weights are equal, and said moving means includes means for moving said weights equal amounts in opposite directions.

6. Apparatus according to claim 5 wherein said moving means includes means for linearly moving said weights.

7. Apparatus according to claim 6 wherein said moving means includes means for moving said weights along a single chord of a circle centered on said rotational axis.

8. Apparatus for changing the rate of oscillation of a balance wheel without affecting its poise comprising a balance staff, a balance wheel mounted on said balance staff, a hairspring coupled thereto for sustaining oscillations of said balance wheel, a pair of weights carried by said balance wheel eccentric to the rotational axis of said balance wheel, and means coupled to said weights for simultaneously moving said weights in opposite directions.

9. Apparatus according to claim 8 wherein said moving means includes means for moving each of said weights along a straight line.

10. Apparatus according to claim 8 wherein said weights are of equal size and mass, said moving means including means for moving said weights equal amounts along paths on one side of a plane containing the rotational axis of said balance wheel.

11. Apparatus according to claim 8 wherein said weights are connected by a straight, rigid bar.

12. Apparatus according to claim 11 wherein said bar is rotatable to move said weights.

13. Apparatus according to claim 8 including a straight rigid bar, and means coupling said weights to each end of said bar whereby said weights move simultaneously to decrease said moment of inertia upon rotation of said bar in a first direction and to increase said moment of inertia upon rotation of said bar in the opposite direction.

14. Apparatus according to claim 13 wherein one of said weights is coupled to said bar by right handed threads and the other of said weights is coupled to said bar by left handed threads.

15. Apparatus according to claim 14 including a pair of bosses on said balance rim, a weight slidable in each boss and keyed thereto against rotation, means forming a screw driver receptacle in one end of said bar, and means on said balance wheel restraining said bar from longitudinal movement.

References Cited
UNITED STATES PATENTS 937,792   10/1909   Grivolas _____ 58—131

RICHARD B. WILKINSON, *Primary Examiner.*

G. M. POLUMBUS, *Assistant Examiner.*

UNITED STATES PATENT OFFICE
CERTIFICATE OF CORRECTION

Patent No. 3,382,667 May 14, 1968

John A. Van Horn

It is certified that error appears in the above identified patent and that said Letters Patent are hereby corrected as shown below:

Column 5, line 46, after "weights" insert -- for moving said weights --.

Signed and sealed this 16th day of December 1969.

(SEAL)
Attest:

Edward M. Fletcher, Jr.
Attesting Officer

WILLIAM E. SCHUYLER, JR.
Commissioner of Patents